United States Patent [19]

Mohr

[11] Patent Number: 5,073,401
[45] Date of Patent: Dec. 17, 1991

[54] AUTOMATED HYDROPONIC GROWING SYSTEM

[76] Inventor: Larry D. Mohr, 5936 S. Dorsey La., Tempe, Ariz. 85283

[21] Appl. No.: 367,186

[22] Filed: Jun. 15, 1989

[51] Int. Cl.$^5$ .............................................. A01C 1/04
[52] U.S. Cl. ...................................... 426/658; 47/56; 426/138; 426/636
[58] Field of Search ...................... 47/56, 9, 61; 426/2, 426/138, 636, 630, 658, 98

[56] References Cited

U.S. PATENT DOCUMENTS

| | | | |
|---|---|---|---|
| 2,648,165 | 8/1953 | Nestor | 47/56 |
| 2,909,003 | 2/1969 | Marshall | 47/56 |
| 3,427,194 | 2/1969 | Lippoldt | 47/9 |
| 3,692,530 | 9/1972 | Graham | 426/636 |
| 3,921,100 | 9/1976 | Weaver | 47/56 X |
| 4,318,248 | 3/1982 | Muldner | 47/56 |
| 4,967,798 | 11/1990 | Hammer | 426/138 |

FOREIGN PATENT DOCUMENTS

| | | | |
|---|---|---|---|
| 1151427 | 8/1983 | Canada | 47/56 |
| 2191925 | 12/1987 | United Kingdom | 47/56 |

*Primary Examiner*—Henry E. Raduazo
*Attorney, Agent, or Firm*—Gregory J. Nelson

[57] ABSTRACT

A sheet seed structure primarily for use in hydroponic systems. The sheet structure includes a substrate of biodegradable and digestible material such as cellulose. The seed is deposited on the substrate and is retained thereon by a sugar or starch adhesive. The sheets are of predetermined size and provided with indicia. At time of use, the appropriate seed sheet is selected and removed from the package and placed in the growing chamber of the hydroponic unit. The seed is sterilized and is charged with a biologically active material such as a probionic.

6 Claims, 4 Drawing Sheets

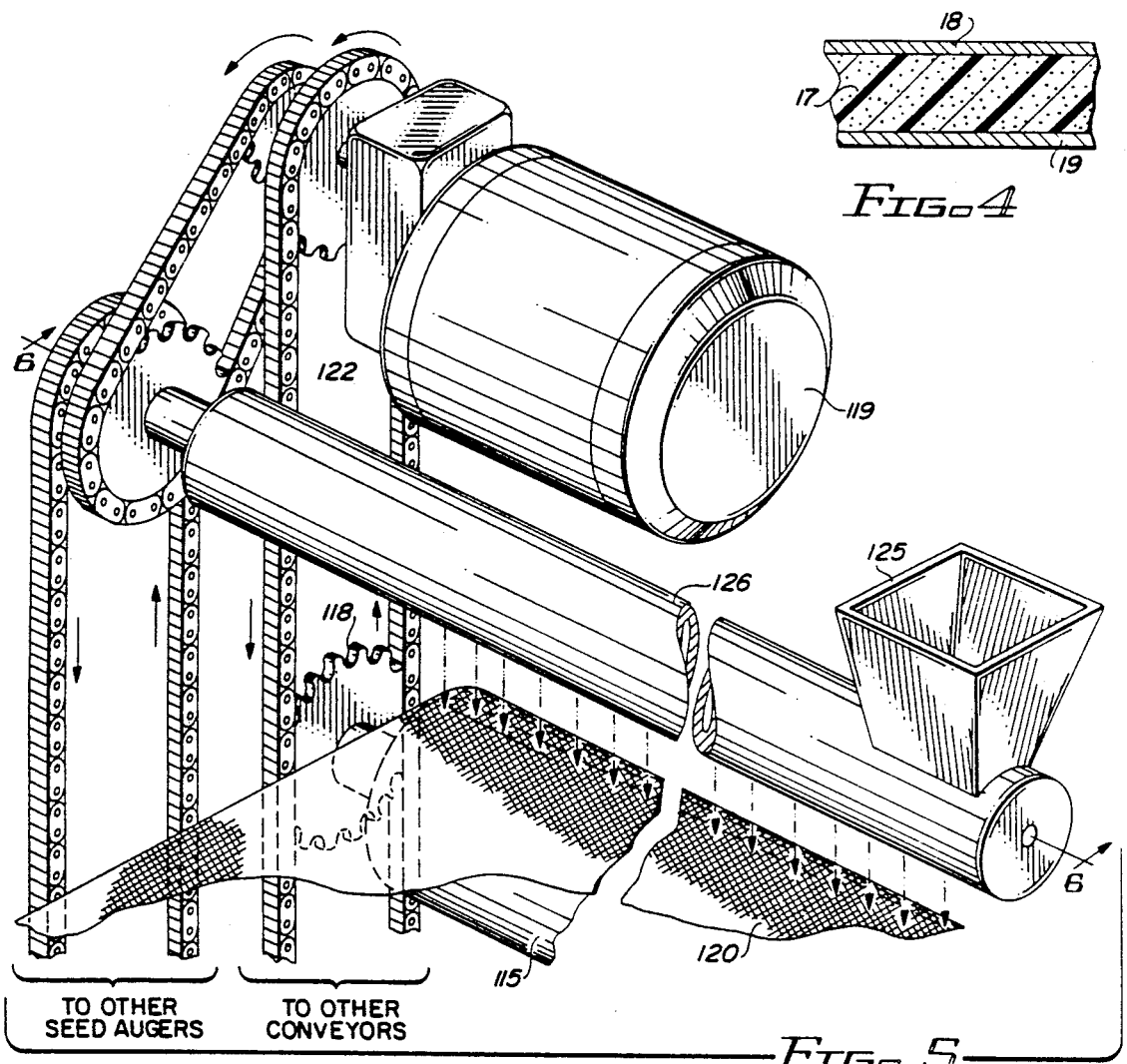
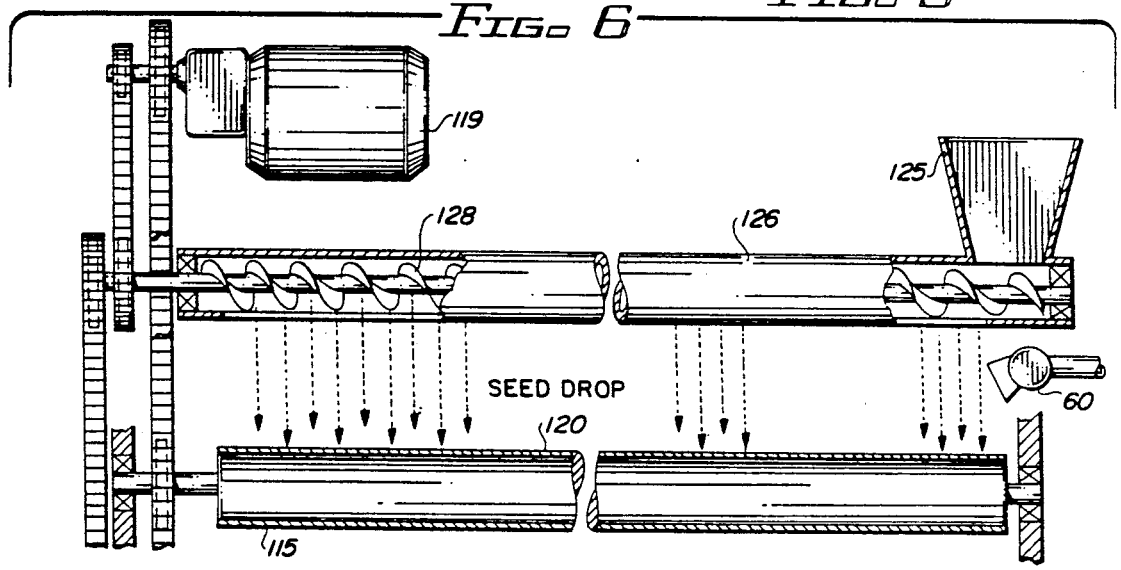

AUTOMATED HYDROPONIC GROWING SYSTEM

The present invention relates to growing systems and more particularly to a method and apparatus for controlled plant growth in an enclosure. More particularly, the invention relates to a hydroponic culture system for cultivating, growing and harvesting living organisms, particularly high quality grains and legumes.

Hydroponics or hydroculture is the art of growing plants without the use of soil and has been practiced for many years. The commercial success of these systems has been somewhat limited over the years but it has been clearly demonstrated that very high grade plants can be rapidly grown utilizing hydroponic methods.

Generally hydroponic systems include a controlled environment enclosure in which the plants are cultivated on some type of root support media or bed. Plant nutrient solution is periodically introduced to the bed. The apparatus includes environmental conditioning equipment such as air circulation systems, air conditioning equipment, heating equipment and means for introducing other components into the environment such as carbon dioxide and carbon monoxide and the like. The unit may be a greenhouse-type unit which is translucent to actinic solar radiation or may be a unit which relies partially or totally on artificial light to support germination and promote plant growth.

Representative prior art hydroponic systems are found in the following patents:

U.S. Pat. No. 2,928,211 to I. Z. Martin, issued Mar. 15, 1960, entitled Hydroponic Apparatus, discloses a hydroponic apparatus having a cabinet with a structure for supporting a plurality of trays within the cabinet. Provision is made for supplying water and nutrients to the trays through a spray system. Fluorescent lights are provided in the cabinet to illuminate the growing plant material in the trays. An air control system including heat pump, heat exchanger, appropriate thermostatic control and blowers are also provided.

U.S. Pat. No. 3,458,951 also issued to I. Z. Martin, dated Aug. 5, 1969, entitled Hydroculture Grass Unit, shows another hydroculture grass unit including a growing chamber in which temperature, humidity, light, ventilation, and irrigation are carefully controlled. The growing trays are arranged in vertical tiers in a manner to promote drainage towards the rear of the growing chamber.

U.S. Pat. No. 3,807,088 entitled "Controlled Environment Hydroponic System", issued Apr. 30, 1974 shows a translucent building in which plants are arranged in a plurality of longitudinally extending planter beds. Nutrients are periodically pumped from a sump to the planter beds. The temperature and humidity within the building is controlled and a spray apparatus is utilized to apply a fine mist over the growing plants when sunlight becomes excessively intense.

The foregoing patents are representative of prior art hydroponic systems utilizing stationary growing beds or trays.

Various hydroponic growing systems can be found in the prior art which are moving or continuous beds. U.S. Pat. No. 3,284,948, entitled "Continuous Hydroponic System", discloses a system for operation in a controlled atmosphere which includes a plurality of flexible open-mesh belts are mounted in tiers, one above the other, with means to feed a continuous cellulose sheet over each of the flexible mesh structures. A seed hopper is provided adjacent the input of the belt to deposit grain of uniform depth onto the sheet during movement of the belt. The seed bed is periodically soaked with nutrients as the belt moves from the input to the output station. At the output station, the plant roots are stripped from the belt for use.

U.S. Pat. No. 3,425,158, entitled "Culture Belt For A Hydroponic System", also issued to L. B. Kyle, discloses an improvement to the '948 patent in which the culture belt has a plurality of upstanding relatively closely spaced laterally extending ribs which support the cellulose strip across the tops of the strips. The ribs define openings through which nutritional liquid may flow and the roots from the germinating seeds may pass.

U.S. Pat. No. 4,068,405 issued to Campbell et al, entitled "Automatic Plant Food Production", discloses a controlled environment for the growth of plants. The enclosure has a plurality of artificial light sources in a growing region. The planting areas are in the form of trays which are mounted for automatic or controlled movement past the light sources to a work area where all planting, cultivating, crop management and harvesting is accomplished to reduce labor expense.

U.S. Pat. No. 4,255,897 issued to Ruthner discloses a lattice arrangement in which the plants are moveable within an enclosed cultivation space in a continuous vertical serpentine path. Illumination means are arranged relative to the circulating plant lattice to artifically illuminate the plants while they are circulating. A measurement space lattice is arranged coextensively with the illumination space lattice to measure selected environmental parameters within the cultivation space. Moisture, nutrients and selected gases may be supplied to the plants as they circulate through the cultivation space.

While the foregoing is generally representative of hydroponic systems in the art, both stationary and moveable belt systems, such systems have found only limited commercial acceptance. This is due to a number of factors including inefficient enclosure designs which are expensive to build and which incorporate substantial non-productive or non-crop growing areas.

Accordingly, it is a broad object of the present invention to provide an improved hydroculture system for growing high-quality plants free of undesirable organisms and chemicals.

It is a broad object of this invention to provide a controlled environment for growing plants, particularly high quality feed plants for animals by hydroculture techniques which produce plants substantially free of chemicals, mold, worms and harmful bacteria and which plants have high nutritional constituents.

It is a more specific object of the invention to provide a modular environmental enclosure for hydroculture systems which is simple, efficient to achieve optimum growing conditions for plants.

It is another object of the present invention to provide an environmental enclosure for hydroculture in which the temperature and humidity within the enclosure are maintained by control of the temperature of the liquid containing sump.

It is another object of the invention to provide a novel harvesting and collection arrangement for receiving and transporting plants harvested from a hydroculture enclosure.

It is another object of the present invention to provide a unique seeding system in which the seed or seed blends are disposed on a laminate structure provided in sheet form to the user and which seed laminate may be disposed on moveable conveyors or belts within the hydroculture enclosure.

It is another object of the invention to provide a laminate seed structure which is digestible and biodegradeable and which structure is charged with nutrients.

Briefly, in accordance with the foregoing objects, the present invention provides a plant growing environment including an insulated modular enclosure with suitable access doors. The enclosure defines a growing chamber area and a control room area. The control room houses the various mechanical and electrical components such as a liquid chiller, pump, drive motors, controls and the like. The floor of the growing chamber defines a sump for collection and retention of a suitable aqueous media which is applied to the plants. A filter extends across the surface of the sump to filter liquid which is drained or returns to the sump after being applied to the plantings. A framework in the growing room supports a plurality of horizontally disposed, spaced apart conveyors. Each conveyor has a continuous flexible belt to which the seeds are applied and which supports the plants during the growing process. At the output end of the growing chamber, the plants are discharged from the belt into a mobile collection hopper which may be used to transport the harvested crop to a location of use. Vertically disposed artificial light tubes are provided at opposite sides of the growing chamber and spray nozzles are disposed at predetermined locations to apply water and nutrients in aqueous solution to the plantings as required.

The temperature of the liquid in the sump is controlled by a suitable chiller and heating coils to control the temperature and humidity in the growing chamber. The chiller and water respond to thermostatic temperature sensors in the growing chamber. The unit also includes means to apply by spraying or other methods suitable biologically active ingredients to increase the digestability of the product when fed to animals and to treat pathogens. These class of materials are generally referred to as "probiotics".

The seed from which the plants or organisms are to be grown may be applied to the conveyors by a transversely extending feed screw at the input end of the unit located above each conveyor. In a preferred embodiment of the invention, the seed is part of a laminate structure of suitable biodegradable and digestable material such as cellulose and the seed is adhesively secured to the laminate by a sugar or starch such as an organic wheat paste or honey. The laminate seed structure is provided in sheets of predetermined size and is preferably color coded to indicate the type of seed or seed mixture. The sheets are hermetically sealed in appropriate packaging. At the time of use, the appropriate color-coded seed sheet is selected by the user, removed from its package and placed on the conveyor at the input end of the growing chamber. The laminate seed structure is preferably sterile and is charged with nutrients which are released upon hydration.

The above and other objects and advantages of the present invention will become more apparent from the following description, claims and drawings in which:

FIG. 4 is a detail view of the enclosure wall construction as indicated in FIG. 1;

FIG. 5 is a detail view of the feed hopper and distribution components;

FIG. 6 is a sectional view taken along lines 6—6 of FIG. 5;

Figure 1:
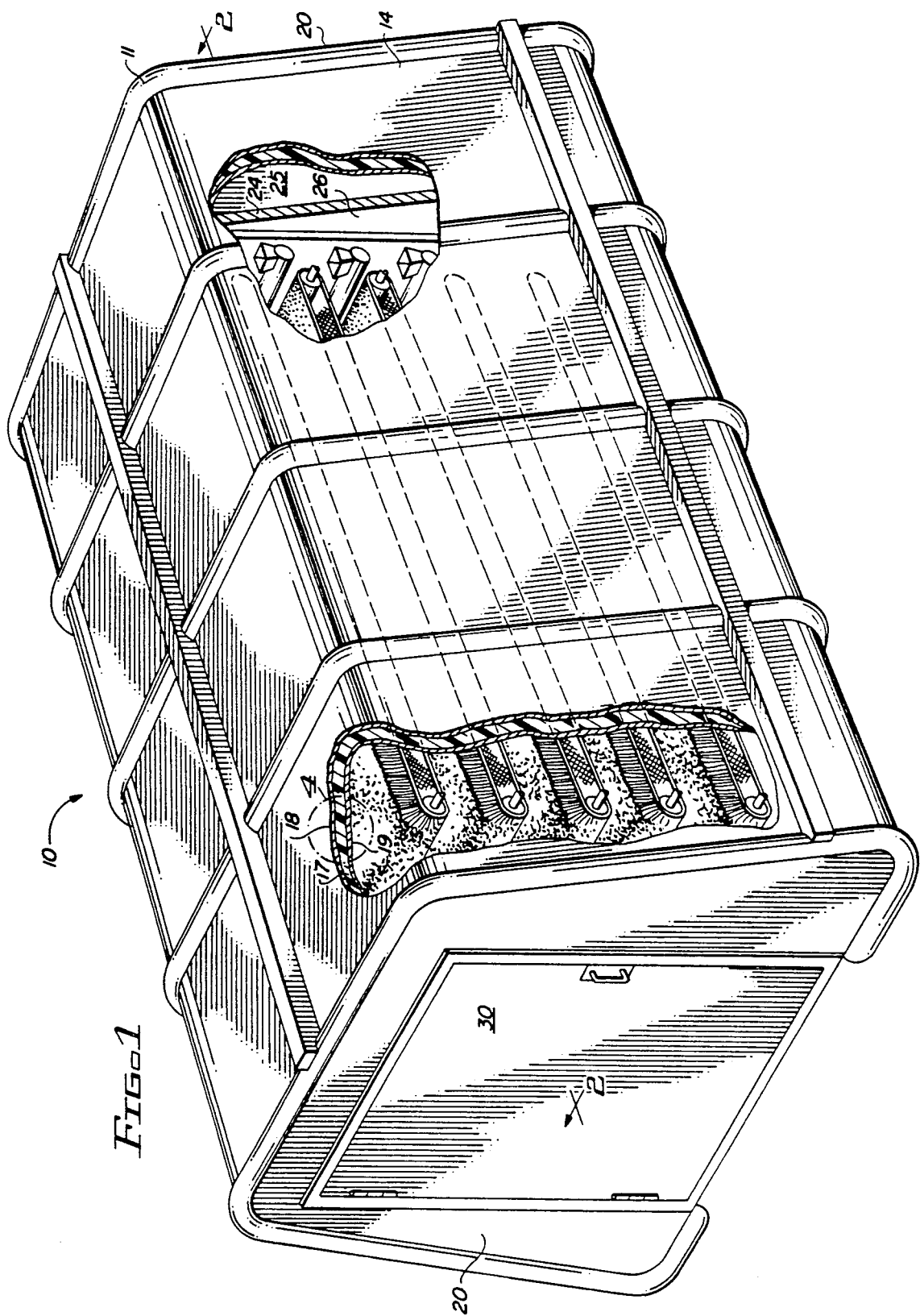
FIG. 1 is a perspective view, partly broken away, illustrating the modular hydroculture growing unit.
Figure 2:
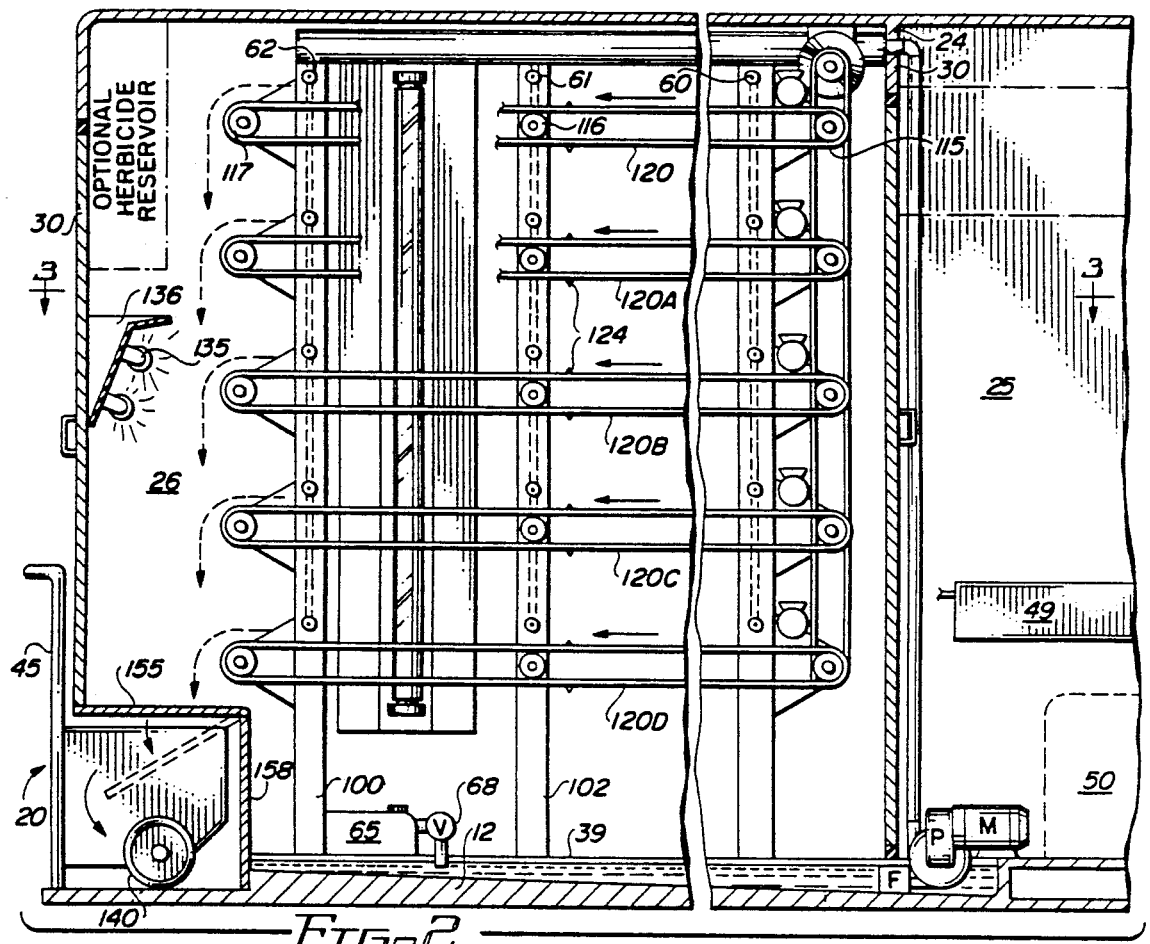
FIG. 2 is a sectional view taken along lines 2—2 of FIG. 1.
Figure 3:
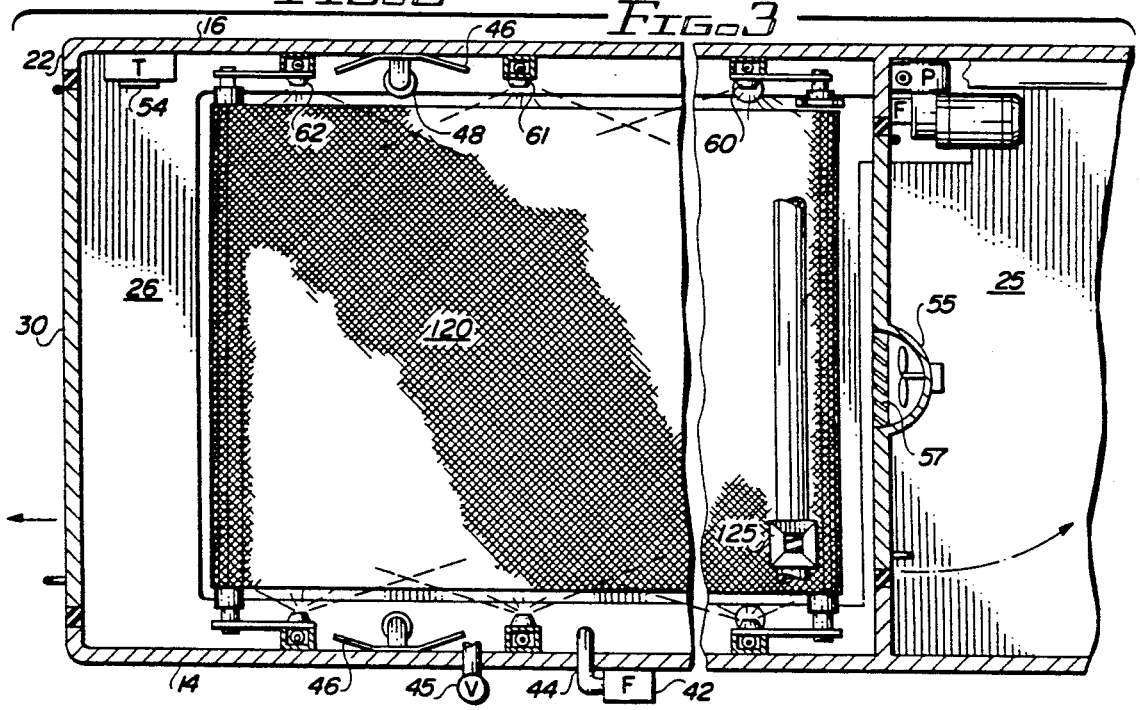
FIG. 3 is a top view of the enclosure with the top of the enclosure removed.

The hydroponic growing unit of the present invention is best shown in FIGS. 1 to 3 and is generally designated by the numeral 10 and includes a housing or enclosure 11 having a floor 12, upstanding side walls 14 and 16, and opposite end walls 20 and 22. An interior partition or bulkhead 24 divides the unit into a control room 25 and an adjacent growing room or chamber 26. An access door, not shown, is provided at end wall 20 providing access to control room 25. Similarly, an access door 30 is provided in end wall 22 providing access to the growing chamber 26. Door 30 is provided in end wall 22 at the output end.

Preferably, as best seen in FIGS. 1 and 4, the housing is contructed from a suitable moisture and chemical resistant synthetic material having interior shell 17, exterior shell 18, separated by an insulative layer of expanded polystyrene or similar material. ABS has been found to be suitable material for the interior and exterior shells. The interior surface of the interior shell of the growing chamber has a light reflective finish and is provided with a protective coating such as an acrylic material. The enclosure and its various components can be fabricated by various well-known molding techniques and can be made as a unitary, modular structure. The various access doors 28 and 30 are suitably sealed around their periphery to render the growing chamber 26 hermetically sealed.

As shown, the control room 25 is located longitudinally adjacent the growing room and houses suitable mechanical and electrical components necessary to the operation of the unit. The growing unit 10 may also be designed with the control room positioned at one longitudinal wall of the unit adjacent the side of the growing chamber.

The interior floor 12 of the growing chamber defines a sump 35 for collection and retention of liquids and is sloped or inclined downwardly toward the partition or wall 24. The sump is suitably connected by suction line 38 to a pump 36 located in the control room or other suitable location. The sump is integrally formed as part of the floor in the fabrication process and is generally coextensive with the plant conveyor system as will be explained hereafter. A screen filter 39 extends horizontally above the sump to remove particulates that may be carried into the sump. Makeup water is supplied to the sump by water line 44. Filter 42 in the water supply line 44 includes an activated charcoal element to remove particulates, hardness and bacterial contaminants from the make-up or supply water entering the sump. A discharge valve 45, which may be electrically operated, communicates with the sump to periodically purge or dump the contents of the sump.

The opposite interior walls of the growing chamber are provided with centrally located, vertically extending reflector sections 46 which house a source of artificial lighting. Preferably the lights are fluorescent lights 48 which serve to illuminate the plants within the enclosure. The sections 46 are preferably provided with a reflective surface to direct the illumination towards the growing plants. The location and spacing of the illumination sources will depend upon the size and dimension of the enclosure. It has been found that illumination is best positioned to illuminate the seed after germination as illumination becomes a necessary factor only after the seeds have begun to germinate. The ballasts 49 for the fluorescent lights are preferably located in a remote location such as in the control room to minimize the heat load in the controlled environment of the growing chamber.

The temperature within the enclosure is controlled by controlling the temperature of the liquid in the sump 35. This is accomplished by a water chiller unit 50 having a heat exchanger element 52. The water chiller operates on a vapor compression cycle apparatus having a condenser coil and an evaporator coil as is well known. The heat exchanger 52 is directly or indirectly connected to the evaporator coil of the chiller to cool the water in the sump. The operation of the chiller 50 is controlled by thermostatic control 54 within the growing chamber 26. The liquid in the sump can also be warmed to a desired temperature in response to thermostatic control 54 by means of heating elements 56 extending within the sump. The heating elements 56 may be heated by electrical means or by combustion of fuels. The chiller and the heater operate to maintain the temperature in the sump at a predetermined level and continuous operation of the pump 36 during the growing cycle is preferable to keep the sump from stratifying. It has been found that by closely controlling the temperature of the liquid in the sump, the temperature within the growing chamber can also be controlled since the sump liquid is periodically sprayed or misted into the growing chamber. The desired temperature depends upon a number of factors but it has been found that for most grain crops, a temperature range of between 65° F. to 85° F. in the growing chamber is desirable. The sump and air temperature are best mainained near the same level to minimize condensation in the growing chamber. A fan 55 is mounted in interior end wall 24 to circulate the atmosphere in the growing chamber 26 and has adjustable louvers 57 to selectively control and direct the air flow.

Provision is made for supplying liquid from the sump to the growing plants. Supply pipe 58 is connected to the discharge port of pump 36 and supplies fluid to a plurality of spray nozzles 60, 61 and 62. Spray nozzles 60 are located in vertical arrays at interior side of walls 14 and 16 of the growing chamber. Spray nozzles 62 are positioned and oriented to provide a predetermined, desired spray pattern generally horizontally above each of the conveyor flights to provide effective coverage of the growing area without causing the seeds or growing plants to be eroded away. Spray nozzles 61 are similarly positioned in a vertical array at the opposite interior side walls at an intermediate location and provide a lighter, misting or fogging application. Spray nozzles 62 are located near the inlet end of the growing chamber and are generally downwardly oriented to apply liquid directly on the newly planted seed on the conveyor flights.

Preferably, the liquid supply system is automatic and operated by program timers to periodically supply liquid from the sump to the nozzles. For most crops application of liquid at short intervals, 3-4 minutes, 3 times per day is adequate. The spray system also includes suitable filters to remove undesirable particulates from the system which might damage the pump or cause the spray nozzles to become clogged. These components are well known to those in the art and detailed description is not deemed necessary.

Nutrients to promote the germination and growing of the plants may also be added to the liquid in the sump 35. This may be done manually or one or more tanks such as tanks 65 containing suitable nutrients or other chemicals may be provided having an outlet discharging into the sump under control of an electric solenoid valve 68. Valve 68 can be opened by a program timer for a suitable period to admit the selected quantities of nutrients into the sump which will be applied to the growing plants by the spray system via nozzles 60, 61 and 62. The sump is purged every few days to prevent build-up of undesirable minerals and contaminants which is accomplished by opening discharge valve 45. The sump is replenished with water by supply line 44 and with nutrients from tank 65.

Within the growing chamber 26, a controlled environment exists which as explained above and employs light sources and also provides moisture and nutrients to the plants. In addition, provision is made to transport the plants through the growing chamber 26 from the input to the output end at a controlled rate related to the growing cycle of the particular plant or organism. For example, with organisms or plants such as wheat, oats or barley, normally approximately six to seven days are required from seeding to harvest at which time the plants are about 8" high and are suitable for feeding to animals.

Within the growing chamber is supporting framework having a series of spaced-apart vertically extending opposed support members 100, 102 and 104 which are disposed within the chamber adjacent opposite side walls 14 and 16. Rollers 115, 116 and 117 extend between the members supporting a plurality of horizontally disposed continuous conveyor belts 120 to 120D, each of which comprise an individual production unit. As best seen in FIG. 6, rollers 115 in each conveyor unit include a drive sprocket 118 at one end suitably driven by a gear motor 119 by a chain 122 which moves the upper surface of the continuous belt from the input end of the growing chamber to the output at a controlled rate which rate may be intermittent and which is under the control of a program timer, not shown. Roller 115 in each conveyor is essentially cylindrical whereas rollers 116 and 117 are crowned so that the diameter of these rollers at the axial midpoint is slightly greater than at their opposite ends which inputs a slope to the conveyor to promote drainage from the conveyor belt. Each of the individual production units is basically the same and accordingly, the upper conveyor is described and shown in detail and this description is applicable to the other such units.

The conveyor belts 120 are a flexible, continuous member of a suitable synthetic, inert material which is resistant to moisture and chemicals such as that sold under the trademark Mylar. Vertical flights 124 are provided at spaced-apart locations on the conveyor belts with the flights extending transversely across the width of the belts. Since the roller 115 adjacent the input of the growing chamber is of uniform diameter, the conveyors are, at their input ends, essentially flat but due to the crown of the rollers will tend to assume a slightly bowed shape to accomodate lateral drainage.

As best seen in FIGS. 3, 5 and 6, adjacent the input end of the growing chamber or located in the control room is a supply hopper 125 which receives the seed which is applied to the surface of the conveyor at each tier or level at the input end of the unit. Communicating with the supply hopper is a horizontally disposed seed conveyor 126 which is positioned immediately above the upper horizontal surface of each production unit conveyor at the input end. The conveyor includes a power driven screw 128 which serves to deliver seed from the hopper to each conveyor and deposit the seed on the subjacent conveyor section 120.

After the seed is deposited onto the conveyor production unit, the conveyor progresses through the growing chamber at a predetermined control rate. The seed is first sprayed with liquid from nozzles 60 to wet the seed which nozzles are generally oriented downwardly to apply a gentle application of moisture to the seeds to initiate germination. Nozzles 61 apply a light moisting to the plants and nozzles 62 apply a controlled temperature spray to the plants at a location nearer the output end of the growing chamber. Any excess liquid will tend to run to opposite sides of the conveyor belt and fall into the subjacent sump for re-use. The temperature of the liquid in the sump 35 is closely controlled to control the temperature within the growing chamber. Once germination begins, growth is promoted by illumination provided by lights 48 disposed at the opposite interior side walls of the growing chamber.

At the output end of the growing chamber, the upper surface of the conveyor 120 complete their pass through the growing zone and then pass over the end rollers 117 causing the plant material on each conveyor belt to be discharged from the associated conveyor. To assist in this, a transversely extending doctor blade may be provided in close proximity to each roller to assist in removing the organisms from the belt. At the time of removal of the plants from the belt, it may be desirable to treat the harvested organism with a suitable biologically active material such as a probiotic. Such treatment may be accomplished by means of spray nozzles 135 connected to supply tank 136 which nozzles are directed and oriented to apply the selected composition to the harvested materials. The application of a probiotics such as *Strep. faecium* will kill pathogens, bacteria and fungus which is particularly important in the case of production of high quality animal feed for show animals or race horses. Probiotics may also be applied during the growing cycle as part of the nutrients applied by the spray system and stored in tank 65.

For removal of harvested materials, a recess 150 is provided in the lower edge of the access door 30 as seen in FIG. 2. Recess 150 accomodates a transversely extending mobile hopper 155 which when in the position shown in FIG. 2, will receive the harvested materials which fall directly into the hopper when discharged from the end of the conveyor belts. A chute 155 is pivotally secured to wall section 158 and is normally spring biased to a closed position engging the upper edge of the recess 150. When material is deposited on the chute, the chute swings downwardly causing the plants to be directed to the hopper 155. When the hopper is filled to the desired capacity, the hopper may be disengaged from the growing unit to transport the harvest material to the desired location of use. To this end, the hopper is provided with rollers or wheels 140 and handle 145 for manual transportation to the hopper. In larger units, the hopper may be provided with a suitable trailer hitch for connection to a prime mover to facilitate transportation of the hopper and the contained harvested plant organisms.

Figure 7:
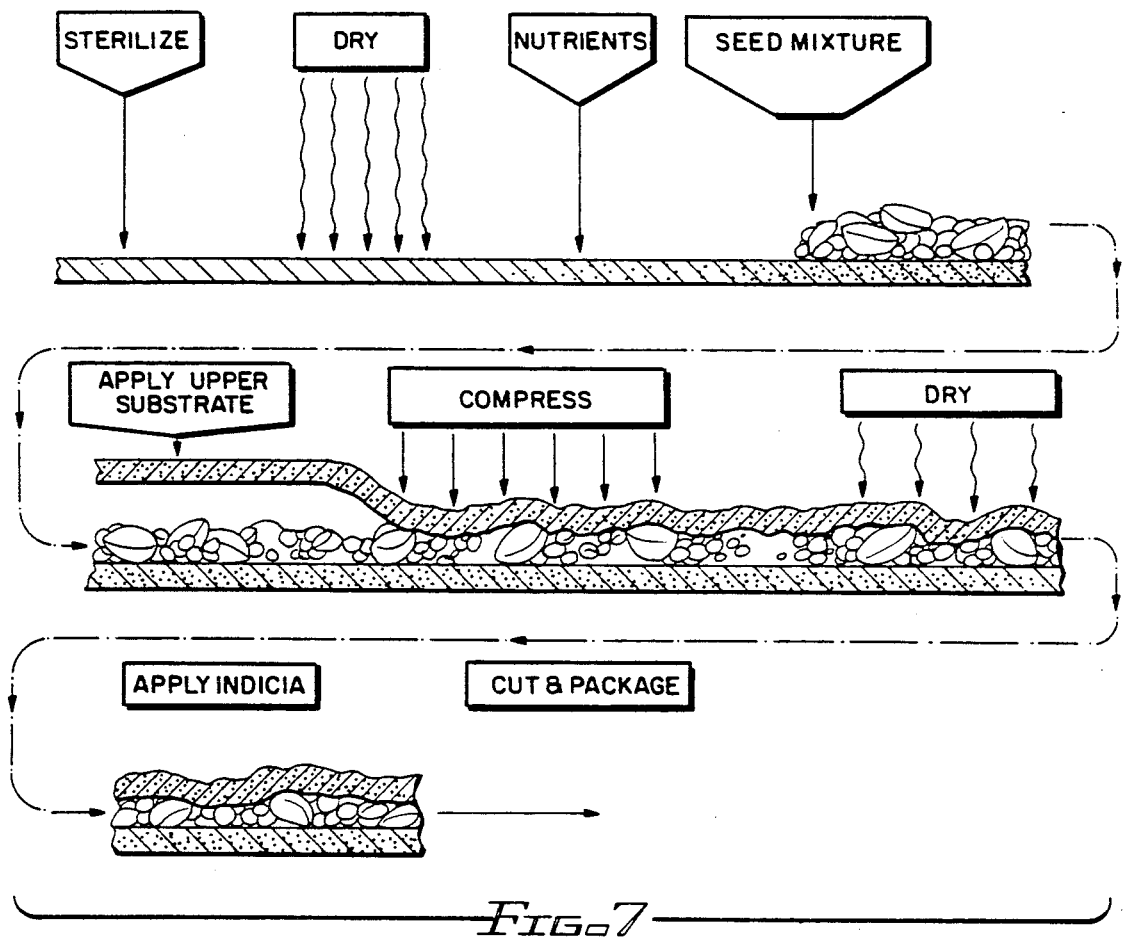
FIG. 7 is a sectional view of the laminate seed structure.
Figure 8:
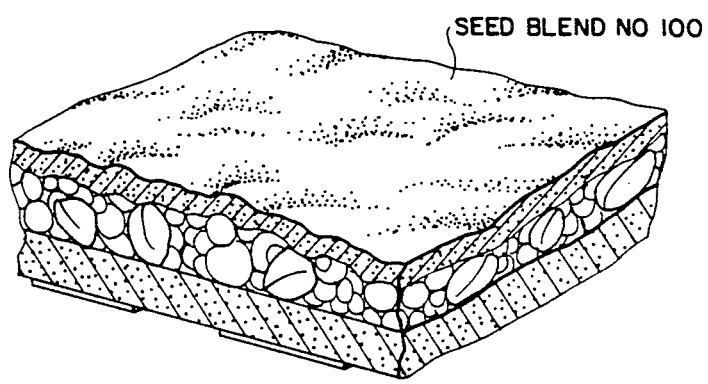
FIG. 8 is a diagramatic representation of the method of fabricating the laminate seed structure.

An important aspect of the present invention is providing a unique planting method which involves the use of a laminate seed substrate as shown in FIGS. 7 and 8. One method of seeding the growing unit is has been described above in which the seeds are dispersed on the surface of the conveyor by an appropriate seed dispenser. However, it is inevitable that some of the loose seeds placed on the conveyor will become washed away or the seeds may tend to clump or agglomerate causing an uneven crop distribution. To this end, the laminate seed structure 200 is provided. The laminate structure preferably is provided to the grower in sheets having a width generally conforming to the width of the conveyor of the growing unit. The laminate sheets may be also cut to size at the time of planting and simply placed on the surface of the conveyor at the input side of the growing chamber.

The laminate seed structure includes a lower supporting substrate 202. The lower substrate 202 has the characteristics of having sufficient strength to support the seed and should be easily cut by knife or other tool. In addition, the substrate 202 should be an organic material which either will partially or totally disintegrate during the growing process or which is easily digestable by animals when they consume the crops grown in the unit in the event the substrate is not completely disintegrated. A suitable material would be a fibrous material such as a cellulose paper.

The seed blend 204 applied to the substrate may be any suitable seed such as grain seed for growing oats, barley, wheat or the like, is evenly distributed on the upper surface of the lower substrate. The seed blend may be a single grain crop or may be a suitable mixture to provide complete custom food for animals. The seeds are covered with an upper coating or substrate 206 which also may be a fibrous organic material such as cellulose and held in place by an adhesive organic starch. Alternately, the upper substrate may be a single coating such as a sugar or starch which is water soluble and which will adhere the seeds in place. Honey or a sugar solution will work for this purpose as will a liquid vegetable starch. Preferably, either one or both of the substrates carry suitable indicia 210 such as color coding to provide the grower with convenient reference system for identifying the particular crop or crop blend to be grown. The grower may then select the appropriate seed substrate by color indicia and proceed with the planting operating. The lower substrate is sterile and may be charged or impregnated with nutrients and other compositions such as probiotics which become active when hydrated.

As seen in FIG. 8, the laminate seed substrate is prepared by first treating the coarser, lower substrate with a sterilizing agent such as chlorine bleach solution. The laminate is flash-dried after it has been treated in the sterilizing solution. A suitable nutrient or probiotic composition may be applied to the substrate prior to drying so the substrate 202 is charged with the composition which is released upon hydration. The appropriate seed blend is then dispersed across the upper surface of the lower substrate. As indicated above, the seed may be single grain or a blend of various grains and soybeans which may be custom prepared in accordance with the requirements of use. As for example, for use in feeding race horses, a blend of whole grains and soybeans may be used. A significant advantage of the seeding method described above when used in a sealed hydroculture growing unit, is the elimination or reduction of certain pathogens and bacteria which may detrimentally effect the animal and which occur in open and growing environments.

Once the seed is dispersed on the upper surface of the lower substrate, the upper substrate or coating 206 which is preferably in the form of a fine cellulose or other paper which is digestable and will deteriorate in the growing process is placed over the seeds. The upper substrate is soaked in an appropriate starch solution such as reserved carbohydrate most commonly encountered in plants such as potatoes, wheat, corn, rice and the like. After the starch-soaked upper substrate is in place, the entire structure is subjected to compression air treatment and flash dried and allowed to cure for an appropriate time, and is then ready for application of color coding 210 and packaging in a hermetically sealed package such as a plastic bag. The prepackaged seed laminates are ready for use when opened and are placed in the growing chamber conveyors. In lieu of the upper tissue-like substrate 206, a coating having adhesive qualities may be applied to retain the seed on the lower substrate 202 and protect it prior to hydration. A natural sugar such as honey or starch solution which is water soluble will work well for this purpose.

In operation, the spray nozzles apply liquid to the growing plants at predetermined intervals for a predetermined time. Various crops such as oats, barley, alfalfa, soy beans, timothy and mixtures of these plants can be grown. The mixture is selected in accordance with the nutritional requirements of the animal and the appropriate seed or seed blend is indicated by the marking or coding on the seed laminate or the seed laminate packaging.

The temperature in the growing chamber is closely controlled by the thermostate which, in turn, control the water temperature in the sump. The conveyor moves the plants through the chamber from germination to harvest normally about six or seven days. Periodically the sump is purged and new make-up water and nutrients added. Outside air requirements are minimal and will generally be provided by normal operational access to the growing chamber. A natural balance between $O_2$ and $CO_2$ will result from the growing process. The controls, not shown, require daily actuation. If a grower wishes to delay the crop for a few days, the system may be left inactuated for a few days during the growing cycle. When the conveyor reaches the end of the system, the crops are discharged into the hopper for transportation to a point of use.

It will be obvious to those skilled in the art to make various changes, alterations and modifications to the hydroponic culture system of the present invention. To the extent such changes, alterations and modifications do not depart from the spirit and scope of the appended claims, they are intended to be encompassed therein.

I claim:

1. A seed sheet structure for applying seed to a controlled growing environment such as a hydroponic growing unit for growing animal feed, said seed sheet comprising:
   (a) a fibrous, sterilized substrate having a surface, said substrate being easily digestible by an animal;
   (b) seed deposited on said surface;
   (c) a biologically active material applied to one of the seed or substrate that upon activation will produce a digestive stimulant;
   (d) said seed carrying substrate being hermetically sealed in a package that will at least partially deteriorate upon hydration; and
   (e) indicia associated with one of the seed substrates or packages for indicating the contents of the seed container.

2. The structure of claim 1 wherein said substrate is a cellulose material.

3. The structure of claim 1 wherein said seeds are retained on said substrate surface by a water soluble adhesive coating.

4. The structure of claim 1 wherein said water soluble coating is selected from the group consisting of starches and sugars.

5. The structure of claim 1 wherein said water soluble coating comprises a cellulose paper.

6. The structure of claim 1 wherein said seed comprises a pre-selected seed mix.

* * * * *